No. 788,959. PATENTED MAY 2, 1905.
H. W. SPANG.
ELECTRIC CIRCUITS AND APPARATUS FOR RAILWAY SIGNALING.
APPLICATION FILED AUG. 21, 1902.
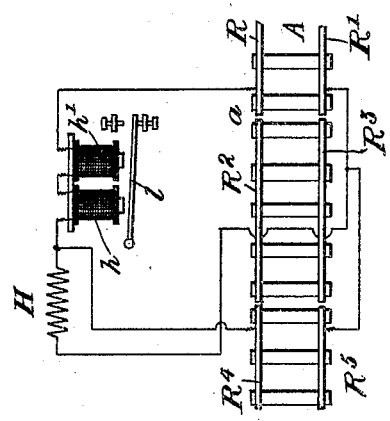
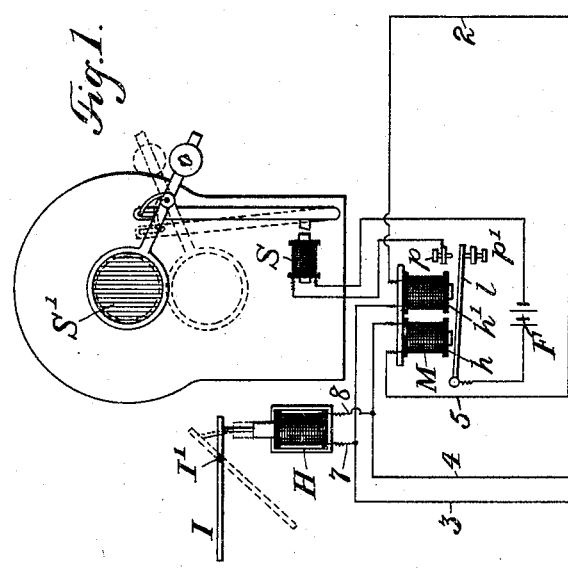
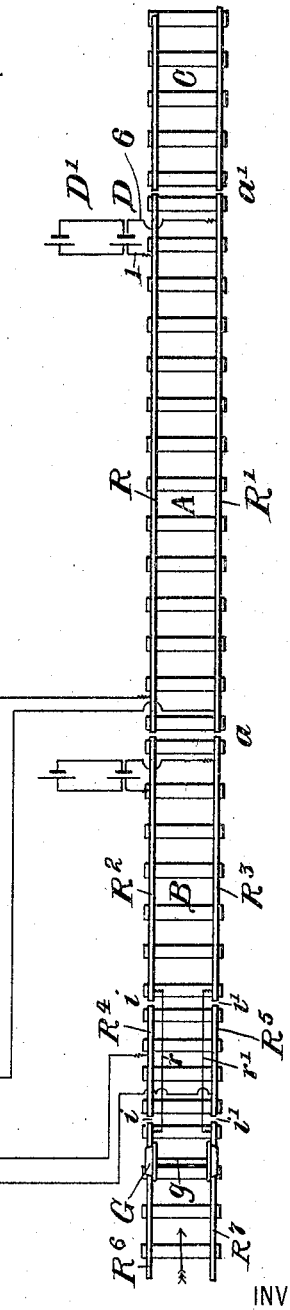
WITNESSES:
A. B. Mattingly
E. L. Lawler
INVENTOR
H. W. Spang
BY
Townsend + Decker
ATTORNEYS No. 788,959.

Patented May 2, 1905.

UNITED STATES PATENT OFFICE.

HENRY W. SPANG, OF NEW YORK, N. Y., ASSIGNOR, BY MESNE ASSIGNMENTS, TO CHARLES H. KETCHAM, OF YONKERS, NEW YORK.

ELECTRIC CIRCUIT AND APPARATUS FOR RAILWAY SIGNALING.

SPECIFICATION forming part of Letters Patent No. 788,959, dated May 2, 1905.

Application filed August 21, 1902. Serial No. 120,448.

*To all whom it may concern:*

Be it known that I, HENRY W. SPANG, a citizen of the United States, and a resident of New York, in the county of New York and State of New York, have invented certain new and useful Improvements in Electric Circuits and Apparatus for Railway Signaling, of which the following is a specification.

My invention relates particularly to that class of electric track-circuits shown in United States Letters Patent, No. 164,227, dated June 8, 1875, in which an insulated section of track is provided at one end with a battery or other generator connected to the two rails of the section and at the other end with a suitable magnet through which the circuit is completed by means of a proper track-circuit closer when a train passes said circuit-closer, and in which the battery of the track-circuit is kept in working order by maintaining it upon a normally closed circuit through a suitable resistance permanently connected in multiple with the magnet.

The object of my present invention is to keep the track-circuit battery or batteries in proper working order by means of a resistance, while at the same permitting the signal-magnet to be energized by the full power of the batteries, which is not possible when the resistance mentioned is maintained permanently in multiple with said magnet.

To this end my invention consists, substantially, in so combining the resistance with the circuit of the battery and relay or other magnet and with the circuit of the track-circuit closer that the latter in the operation of completing the track-circuit for the purpose of energizing the magnet will at the same time short-circuit the resistance and leave the magnet to be energized by the full power of the batteries. In carrying out this part of my invention I locate the resistance in series with the magnet and complete the connection from one to the other of the two lines of rails at the end of the section where the magnet is located through said magnet and resistance in series with one another. The track-circuit closer is then connected to the circuit of the magnet and section of track in such manner that it will perform its usual function of completing a connection from one to the other of the two lines of rails of said section, but in so doing will form a short circuit around the resistance.

Another part of my invention consists in utilizing said resistance to effectually serve as an impedance or choke coil, so as to prevent the electricity induced by the charged clouds during a thunder-storm in the two lines of rails from flowing through the magnet when such induced electricity discharges from the rails and track-circuit to the ties, ballast, &c., simultaneously with the lightning discharges taking place between clouds and earth at adjacent or distant points.

Another part of my invention consists in using as a resistance for the purpose above described the coils of an electromagnet which operates an indicating device adapted to show to the engineer or the signal-maintainer while passing on a train the condition of the track-batteries or batteries and track-circuit or the presence of induced electricity in the track-circuit during thunder-storms, aurora borealis, &c., or the presence of a vagrant current in the rails coming from an electric railway or from other electric power or light conductors.

In place of using the resistance as a magnet-coil it also might be used in other ways to give a signal or indication of the presence or absence of an electric current in said resistance.

Another part of my invention consists in the combination, with the semaphoric or visual signal which is set or changed by the action of the track-circuit closer and over the circuit formed of the rails of a section of track when the train approaches said section, of an additional or supplementary signal or indicating device, which being maintained or operated over a normally closed circuit formed over the rails of the section shows by its condition or position the condition of the track-circuit as the engineer approaches the signal, which is changed or operated by means of the track-circuit closer.

By the term "track-circuit closer" I mean any device adapted to close or change an electric circuit and operated or actuated by the passage of a train as it approaches the section of track, switch, drawbridge, or other portion of the permanent way to be guarded. My invention consists also in other combinations of devices, as more particularly hereinafter claimed.

In the accompanying drawings, Figure 1 is a diagram illustrating one form of my invention as applied to one track of a double-track system in which the trains always move in one direction, as indicated by the arrow, the second or return track not being illustrated herein. Fig. 2 shows a modification in the location of the resistance.

A is a section of railway-track which may be a mile long, more or less, and having its two lines of rails R R' separated from the rails of adjacent sections B and C electrically, as indicated at $a$ and $a'$. Each line of rails in each section should be provided with suitable bonds or electric connections at the rail-joints, as well understood in the art.

Insulated rails or sections of rail $R^4 R^5$ in the track-section B form, in connection with wheels G and axle $g$ of the rolling equipment, a track-circuit closer or controller. Each rail $R^4 R^5$ can be a single rail or two or more bonded rails, the number so bonded depending upon the type of signal or indicator employed and the rapidity of action of its mechanism. In some cases single insulated rails could be employed. Rails $R^2 R^3 R^6 R^7$ are connected around the insulated rails forming the track-circuit closer by suitable metallic connectors $r$ $r'$. The track-circuit closer is located at such a point in advance of the section ahead—that is to say, of section A—that when the wheels and axle complete a connection over said track-circuit closer the signal will be given thereby at a safe distance ahead of the end $a$ of said section A.

D D' are gravity batteries or cells connected in multiple, as shown. In some cases they can be connected in series, or a single battery can be employed.

M is an electromagnet of suitable type having its terminals connected to the two rails or lines of rails forming section A. This electromagnet controls directly or indirectly the signal. In the present case it is supposed to be an electromagnet operating as a relay. The armature-lever of said magnet controls the local circuit of an electromagnet S, which operates on a signal S' of any desired or usual character, or said local circuit might, as well understood in the art, include any other current-indicating device. The lever $l$ when the magnet M is sufficiently energized closes said local circuit on its front stop $p$. When the lever is against its back stop $p'$, said local circuit is open. The armature is moved in one direction by the magnetism and in the other by gravity or a spring. The helices $h$ $h'$ are connected in a circuit from one to the other of the lines of rails R R', as indicated; but in the circuit with said helices is included a resistance H, placed, if desired, in the connection between the two helices $h$ $h'$. The two terminals of the resistance are connected, respectively, with the track-circuit closer $R^4 R^5$.

Resistance H can be an ordinary artificial resistance; but preferably I utilize it as a means for controlling the position or condition of an indicator or signal device, which may be, as shown, an indicator-arm I, pivoted at I' and connected to the movable core or armature of an electromagnet whose coils constitute the resistance H. When the magnet is energized, the indicator will stand in horizontal position; but when deënergized by the action of the track-circuit closer the indicator will fall by gravity and assume the position indicated in dotted lines. In most cases it will be necessary to employ the wire coil or coils H in a signal-controlling relay instead of directly operating an indicator, as shown. Any other device might be employed for the purpose. Thus, for instance, the wire-coils of H might operate as the coil of a tangent galvanometer acting on a suitable needle or could be employed in any other suitable way for electric-current-indicating purposes, as well understood in the art.

Resistance H should be of sufficient value to render the relay-magnet M inoperative or incapable of drawing up its armature-lever $l$ so long as the battery has to encounter the resistance of H and coils or relay-magnet M; but when the resistance H is shunted by wheels G and axle $g$, making contact with rails $R^4 R^5$, the current of the battery by flowing through the coils of the relay and in the short circuit formed by said track-circuit closer around the resistance will fully energize the relay-magnet and draw up the armature-lever $l$. This is the action which takes place provided that the current from said battery flows over the section of guard-circuit composed of track-section A without disturbance, which it may do if said section is clear.

The resistance H normally operates to keep the circuit of the gravity-batteries D D' normally closed, and thereby keeps them in proper working order, and so that their life will be prolonged for a greater time than is possible when their circuit is normally closed through a circuit including only the resistance of the coils of magnet M. The resistance H will also serve as an impedance or choke coil and cause the induced electricity of the rails to discharge simultaneously with lightning discharges into the adjacent ties, ballast, and earth and not flow through the helices of electromagnet M.

The indicator I can be located adjacent to the signal S' and so employed as to clearly reveal to an engineer or signal-maintainer the condition of batteries D D' and the track or other circuit in which the coils H are included. It will obviously show the presence of an induced or foreign current in said track-circuit and will by its condition or position show whether section of track A is clear or is occupied by any of the rolling equipment which will by its wheels and axles shunt the battery from the coils of the indicator. Indicator I may therefore serve as an auxiliary signal in connection with the usual semaphoric or usual visual signal or other signal controlled over the track-circuit and track-circuit closer, thereby providing two sets of signals for the government of the engineer—namely, one which acts or gives an indication before and when the train reaches the circuit-closer R⁴ R⁵ and the other the usual visual or other signal when the train reaches said circuit-closer.

The operation of the apparatus would be as follows: When section of track A is clear and wheels G of a locomotive moving in the direction of the arrow reach insulated rails R⁴ R⁵, the resistance H is shunted and at the same time the helices of the relay-magnet M are fully energized by current of batteries D D′ flowing over wire 1, rails R, wire 2, helix $h$, wire 3, rail or rails R⁵, wheels and axle G $g$, rails R⁴, wire 4, helix $h'$, wire 5, rails R′, and wire 6, causing lever $l$ to close the circuit of battery F through magnet S or other device, and thus give a signal indicating "safety." Normally if a signal disk or arm is employed, such as disk S′, it would preferably be displayed to show "danger" when the relay-magnet M is not sufficiently energized by the batteries, and so that the circuit of battery F would be open. If section of track A be clear and relay-magnet M is fully energized by the shunting of resistance H through track-circuit closer R⁴ R⁵, the circuit of battery F would be closed and a safety-signal indicated by the disk assuming position indicated in dotted line where it is obscured. Obviously a safety-signal could be given in other ways. Should the signal be in the dotted-line position—that is to say, should it indicate "safety" when seen by the engineer before the locomotive reaches rails R⁴ R⁵, he will know that the lever $l$ of magnet M has stuck to point $p$ and closed the circuit of battery F or that the signal mechanism has stuck or is otherwise out of order. It is obvious that under this system an engineer cannot be misled by a defective relay-magnet or defective signal mechanism.

Ashes, ballast, sand, &c., should be removed from rails R⁴ R⁵, so as to reduce the leakage thereat of current from batteries D D′ to a minimum.

Instead of insulated rail-sections and wheels and axles for shunting the resistance H any other suitable circuit-controlling devices operated by the locomotive or other rolling equipment can be employed.

I do not limit myself to the particular means described whereby magnet M may cause a signal to be given, since the visual or audible signal may be given or controlled by said magnet by other mechanical or electrical means, as well understood in the art.

I do not limit myself to locating the resistance in a connection between two coils of the magnet M, since it may obviously be located in the circuit to one side of either or both of said coils, as indicated in Fig. 2.

While my invention is of special utility in connection with a railway-signal guard or control-circuit consisting of a block or section of railway-track, it is also useful for other guard-circuits which are normally maintained in closed condition over a drawbridge or over parts connected with or controlled by a railway-switch standing normally in safety position for the passage of a train.

What I claim as my invention is—

1. The combination substantially as described of a track-circuit, a battery or batteries connected to one end of the section of the track, a magnet connected to the other end, an artificial resistance at the same end of section as magnet and normally maintained in series circuit with said magnet, and a track-circuit closer operated as the train approaches said section of track for placing the magnet in a direct connection from one to the other of the two lines of rails and at the same time, completing a short circuit around the resistance.

2. The combination substantially as described of an insulated section of railway-track, a battery or batteries connected to one end of said section, a magnet in a normal connection between the two lines of rails at the other end of the section, said connection being normally of such high resistance as to prevent the magnet from being fully energized by the battery, and a track-circuit closer adapted to be operated as the train approaches the section of track to which said magnet is connected and to shunt said resistance out of the circuit and thus permit the magnet to be energized.

3. The combination substantially as described, with an insulated section of railway-track, of a battery or batteries connected thereto, a magnet at the end of the section remote from said battery, a track-circuit closer for completing the connection of the two lines of rails through said magnet, and simultaneously shunting an indicator the actuating or controlling electrical portion of which constitutes an artificial resistance through which the circuit of the battery is normally completed for the purpose of maintaining the same on a high-resistance circuit to keep it in good working order, the said indicator being at same end of track-section as the said magnet and in series circuit therewith.

4. The combination substantially as described of a normally closed track-circuit having a battery at one end thereof and a signal-controlling magnet, normally inoperative and an indicator normally operative, and in series circuit with said magnet both at other end thereof and a track-circuit closer located ahead of said track-circuit and adapted to indicate by the signal-controlling magnet the same condition of the track-circuit as normally indicated by the said indicator.

5. The combination substantially as described of a track-circuit and battery therefor on normally closed circuit through an electric indicator at the end of the section remote from the battery, a signal-controlling magnet at the same end of the section as the indicator, a track-circuit closer operated by a train as it approaches the end of the section to which said controlling-magnet is connected in the connection with said signal-magnet, and means whereby said track-circuit closer may short-circuit the indicator when it completes connection for said magnet.

6. The combination in an electric railway signal apparatus, of a normally closed guard-circuit, normally charged, a signal-controlling magnet in said circuit but normally inoperative, a resistance in said circuit, a track-circuit closer for completing a normally open connection of said electromagnet before reaching the section of track embraced in said guard-circuit and connections for simultaneously removing the resistance from the circuit as and for the purpose described.

7. The combination substantially as described in a railway signal apparatus, of a normally closed guard-circuit having a battery at one end, an electromagnet and an artificial resistance in series circuit with said magnet both at the other end, insulated rail-sections connected to the terminals of said resistance and located ahead of said guard-circuit, and wheels and axles of the rolling equipment adapted to bridge said rail-sections and thereby simultaneously shunting the said resistance and energizing said magnet as and for the purpose set forth.

8. The combination, substantially as described, in a railway signal apparatus, of a normally closed guard-circuit, having a battery at one end, a signal-controlling magnet normally inoperative, a local circuit controlled by said magnet normally open with signal at danger, an artificial resistance in series circuit with said magnet, both at the other end, and a track-circuit closer located ahead of said guard-circuit and simultaneously serving to shunt said resistance and energize the magnet and thereby close the local circuit and change the danger signal to safety.

9. The combination with an electric track-circuit, normally closed, comprising two lines of rails and including a battery at one end, a magnet and an indicator in series circuit with said magnet both at the other end, insulated rail-sections connected to the terminals of said indicator and located ahead of said track-circuit, and wheels and axles of the rolling equipment adapted to bridge said rail-sections and thereby simultaneously shunting the said indicator and energizing the said magnet as and for the purpose set forth.

10. The combination in an electric railway signal apparatus, of a normally closed guard-circuit, normally charged by battery at one end thereof, a signal-controlling magnet, normally operative, a signal-controlling magnet normally inoperative, both magnets being in series circuit at the other end of said guard-circuit, and means for simultaneously deënergizing one magnet and energizing the other magnet substantially as described.

11. The combination of magnet M, a local signal-circuit controlled thereby, rails R, R', of a section of track A, to which said magnet is connected, battery or batteries D, D', connected to said section at one end thereof, an electric indicator I connected to the other end of said section, rails $R^4$, $R^5$, connected to section A through coils of magnet M and located in adjacent section B, all so arranged that normally indicator I will show condition of battery-current and track-circuit of section A, while magnet M may be energized by the shunting of resistance over rails $R^4$, $R^5$.

12. The combination in a railway signal apparatus, of a guard-circuit, a signal-controlling magnet M connected across said guard-circuit at one end thereof and having an artificial resistance between helices of said magnet, a battery connected across the two sides of said guard-circuit at the opposite end thereof and means independent of said guard-circuit for connecting the terminals of said resistance to one another so as to short-circuit the same, as and for the purpose described.

13. The combination in a railway signal apparatus, of a normally inert signal-controlling magnet, a guard-circuit over which the same is energized, a signal subject to the sole control of said magnet and normally indicating danger, an auxiliary indicator in a normally closed circuit formed over said guard-circuit and normally indicating safety to the engineer as he approaches the point where the said signal-magnet is operated, and a track-circuit closer for completing a connection whereby said signal-magnet may be operated over the said guard-circuit to also give a signal to the engineer, as and for the purpose described.

14. In a railway signal apparatus, the combination of a relay-magnet M, a visual signal controlled thereby, an indicator I in the circuit of said magnet, rails R, R', of a section of railway-track, a battery or batteries D, D', on normally closed circuit through said rails, indicator and magnet, and a circuit-controller and connections for shunting said indicator as the train approaches the section of track to which said indicator and magnet are connected, all so arranged that two different signals will be given when the section of track is clear.

15. The combination in a railway signal apparatus, of a guard or safety circuit, a signal-magnet normally inoperative but on closed circuit, an indicator having an actuating or controlling magnet normally energized over said closed circuit and forming an artificial resistance to render the first-named magnet normally inoperative, and a circuit-controller having connections for shunting the magnet of the indicator, thereby causing the indicator to change position or condition, and at the same time energizing the normally inoperative signal-magnet so as to cause an independent signal to be given.

Signed at New York city, in the county of New York and State of New York, this 18th day of August, A. D. 1902.

HENRY W. SPANG.

Witnesses:
    J. GALLWITZ,
    E. L. LAWLER.